United States Patent
Kim (10) Patent No.: US 6,756,319 B2
(45) Date of Patent: Jun. 29, 2004

(54) SILICA MICROSTRUCTURE AND FABRICATION METHOD THEREOF

(75) Inventor: Dong-Su Kim, Anyang-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 09/899,784

(22) Filed: Jul. 5, 2001

(65) Prior Publication Data

US 2002/0004316 A1 Jan. 10, 2002

(30) Foreign Application Priority Data

Jul. 6, 2000 (KR) .................................. 2000-38692

(51) Int. Cl.[7] .............................................. H01L 21/00
(52) U.S. Cl. ...................... 438/761; 438/764; 438/778
(58) Field of Search ................................ 438/778, 787, 438/761, 764

(56) References Cited

U.S. PATENT DOCUMENTS

| | | | | |
|---|---|---|---|---|
| 5,284,549 A | * | 2/1994 | Barnes et al. ................. | 216/67 |
| 5,330,920 A | * | 7/1994 | Soleimani et al. .. | 148/DIG. 118 |
| 6,025,234 A | * | 2/2000 | Chou ........................ | 438/221 |
| 6,051,510 A | * | 4/2000 | Fulford et al. ............... | 438/778 |
| 6,262,455 B1 | * | 7/2001 | Lutze et al. ................. | 257/288 |
| 6,268,287 B1 | * | 7/2001 | Young et al. ............... | 438/671 |
| 6,306,706 B1 | * | 10/2001 | Chan et al. ................. | 29/25.01 |
| 6,340,435 B1 | * | 1/2002 | Bjorkman et al. ............ | 216/13 |
| 6,376,156 B1 | * | 4/2002 | Cheng et al. ................ | 430/313 |
| 2002/0031711 A1 | * | 3/2002 | Steinberg et al. .............. | 430/5 |

FOREIGN PATENT DOCUMENTS

| | | | |
|---|---|---|---|
| JP | 64-031586 | 2/1989 | .......... B23K/26/00 |
| JP | 04-313710 | 11/1992 | ............ G02B/6/30 |
| JP | 07-241690 | 9/1995 | .......... B23K/26/00 |
| JP | 07-283215 | 10/1995 | ....... H01L/21/3205 |
| JP | 10-268526 | 10/1998 | ............. G03F/7/26 |
| JP | 11-095055 | 4/1999 | ............ G02B/6/13 |
| JP | 11-204414 | 7/1999 | ......... H01L/21/027 |

* cited by examiner

Primary Examiner—George Fourson
Assistant Examiner—Fernando L. Toledo
(74) Attorney, Agent, or Firm—Cha & Reiter, LLC (57) ABSTRACT

There is provided a silica microstructure fabrication method. An etch stop layer is first partially deposited on an etching area of a first silica layer formed on a semiconductor substrate. A second silica layer is deposited on the surfaces of the etch stop layer and the first silica layer. A mask patterned according to the shape of the etching area is formed on the surface of the second silica layer. The second silica layer is removed from the etching area using the mask by dry etching, and the etch stop layer is removed by wet etching. A silica microstructure which is manufactured according to the present method has the second silica layer removed according to a predetermined vertical profile to provide a precise removal of the overcladding layer in a microstructure.

13 Claims, 11 Drawing Sheets

SILICA MICROSTRUCTURE AND FABRICATION METHOD THEREOF

CLAIM OF PRIORITY

This application claims priority to an application entitled "Method of Fabricating Silica Microstructures", filed in the Korean Intellectual Property Office on Jul. 6, 2000 and assigned Serial No. 2000-38692, the contents of which are hereby incorporated by reference.

BACKGROUND OF THE INVENTION

1. Field of the Invention

The present invention relates generally to integrated optical devices. More particularly, the present invention relates to a method of fabricating silica microstructures.

2. Description of the Related Art

Integrated optics technology has continuously been developed. The integrated optics is characterized by small size, low price, low power, and high speed as compared to assembly of individual optical parts. As integrated optical devices, a planar lightwave circuit (PLC) and a microelectromechanical system (MEMS) are now attracting attention.

PLC refers to a device with a waveguide formed of silica being a fiber material on a silicon substrate. It is known that an existing fiber optic-type splitter is superior to a PLC splitter at a split ratio up to 1×4 but vice versa at a higher split ratio. The PLC realizes a compact and mass-produced circuit and provides excellent cost performance.

MEMS emerged from silicon processing technology, and primitive MEMS applications include valves, motors, pumps, gears, and the like that are formed two-dimensionally. Integration of micro devices through anisotropical etching of a semiconductor substrate was studied and three-dimensional fiber optic devices have been developed. However, there has been recently developed technology in this field regarding fabrication of three-dimensional thin film structures by etching a sacrificial thin film on a semiconductor substrate.

In order to fabricate silica microstructures such as PLC and MEMS devices, it is necessary to etch a silica layer to a specific depth. For example, integrated devices must be arranged perpendicularly to a silica light waveguide in fabricating a silica PLC in a hybrid integration scheme. To do so, the overcladding layer of the silica light waveguide must be removed from its core layer to a predetermined depth.

However, because the overcladding layer is formed on the core layer with a thickness deviation of 7 $\mu$m or greater, the thickness of the overcladding layer cannot be accurately determined. Therefore, it is very difficult to etch the overcladding layer to the predetermined depth.

SUMMARY OF THE INVENTION

It is, therefore, an object of the present invention to provide a silica microstructures fabrication method for stopping etching at a desired position during a dry etch.

The foregoing and other objects can be achieved by providing a silica microstructure fabrication method. An etch stop layer is first partially deposited on an etching area of a first silica layer formed on a semiconductor substrate. A second silica layer is deposited on the surfaces of the etch stop layer and the first silica layer. A mask patterned according to the shape of the etching area is formed on the surface of the second silica layer. The second silica layer is removed from the etching area using the mask by dry etching, and the etch stop layer is removed by wet etching.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1A:
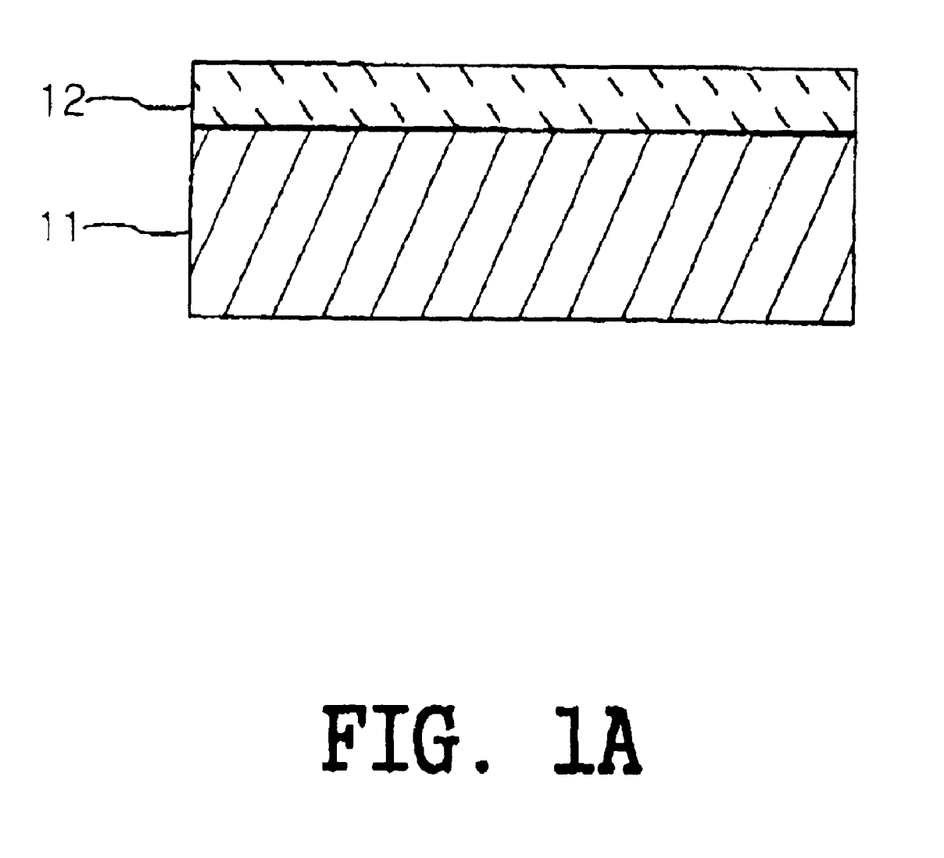
FIG. 1A illustrates a cross section of a substrate having a first silica layer deposited thereon.

FIG. 1A illustrates the step of depositing a first silica layer 12 on a silicon substrate 11. The first silica layer 12 is formed by deposition including but not limited to flame hydrolysis deposition, APCVD (Atmospheric Pressure Chemical Vapor Deposition), PACVD (Plasma Enhanced CVD), and thermal oxidation.

Figure 1B:
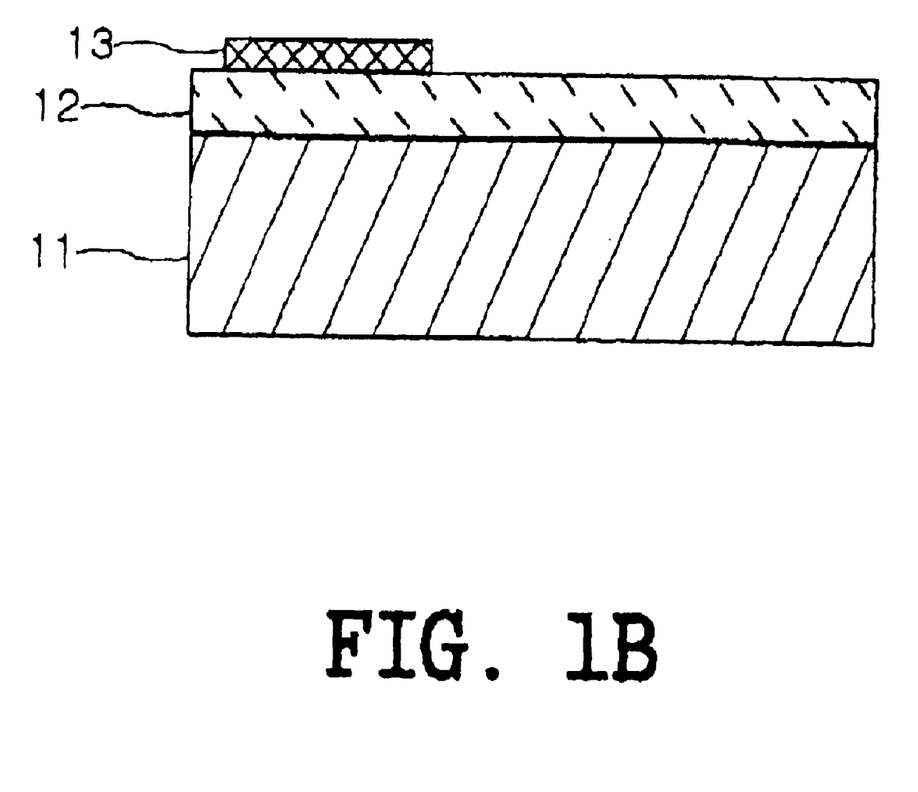
FIG. 1B illustrates a cross section of the layered structure from FIG. 1A having an etch stop layer partially deposited on the first silica layer.

FIG. 1B illustrates the step of partially depositing an etch stop layer 13 on an etching area of the first silica layer 12. The etch stop layer 13 is partially deposited by loft-off or etching.

In the case of lift-off, a photoresist layer is deposited on the first silica layer 12 and patterned according to the shape of the etching area. Then, an etch stop layer is formed on the photoresist layer and the first silica layer 12 by e-beams or sputtering and the photoresist layer is removed along with the etch stop layer formed on the photoresist layer using a photoresist remover like acetone.

In the case of etching, an etch stop layer is first formed on the first silica layer 12 by e-beams or sputtering and a photoresist layer is formed on the etch stop layer and patterned according to the shape of the etching area. Then, the etch stop layer is dry-etched using the photoresist pattern. RIE (Reactive Ion Etching) can be used for the dry etching of the etch stop layer.

The etch stop layer 13 must be formed of a material having a high etch selectivity with respect to silica and resistant against oxidation or corrosion during silica deposition. Such materials include gold and platinum, which may incur clustering due to surface tension if silica deposition at high temperature such as flame hydrolysis deposition is applied. Ceramic materials for the etch stop layer 13 include alumina tolerant at high temperature and showing a high etch selectivity.

Figure 2A:
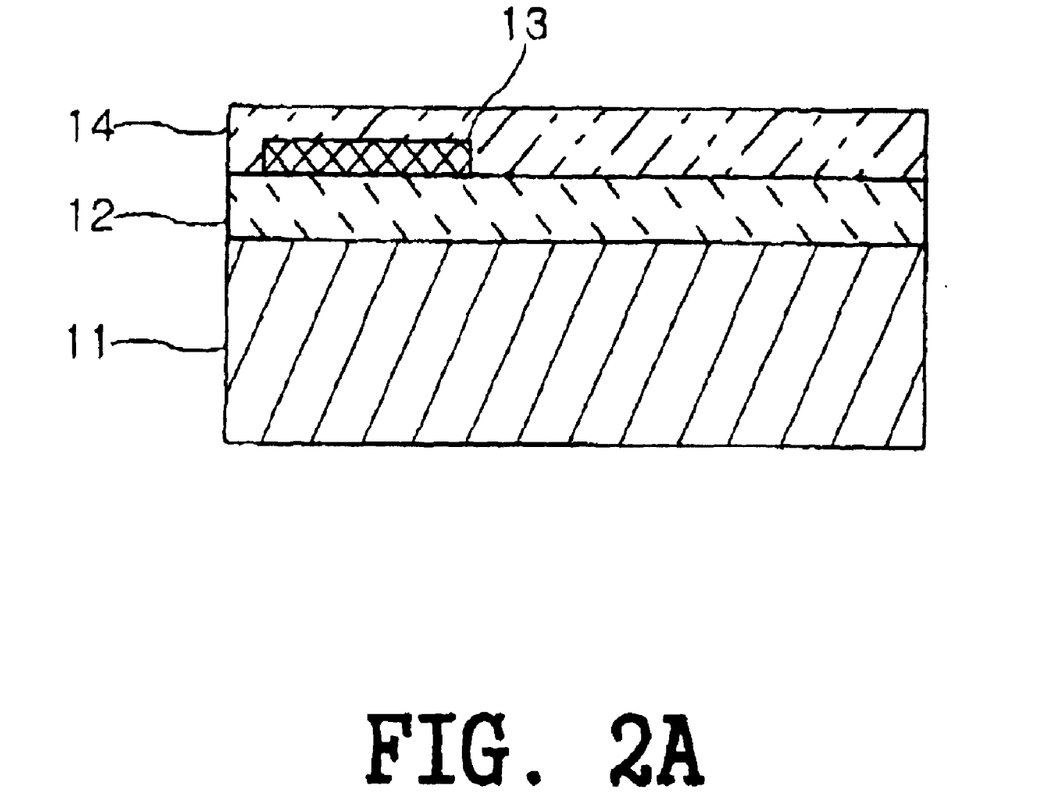
FIG. 2A illustrates a cross section of the layered structure from FIG. 1B having a second silica layer deposited on the surface.

FIG. 2A illustrates the step of a second silica layer 14 on the overall surface of the resultant structure including the etch stop layer 13 and the first silica layer 12. The second silica layer 14 can be formed in the same manner as the first silica layer 12, that is, by deposition.

Figure 2B:
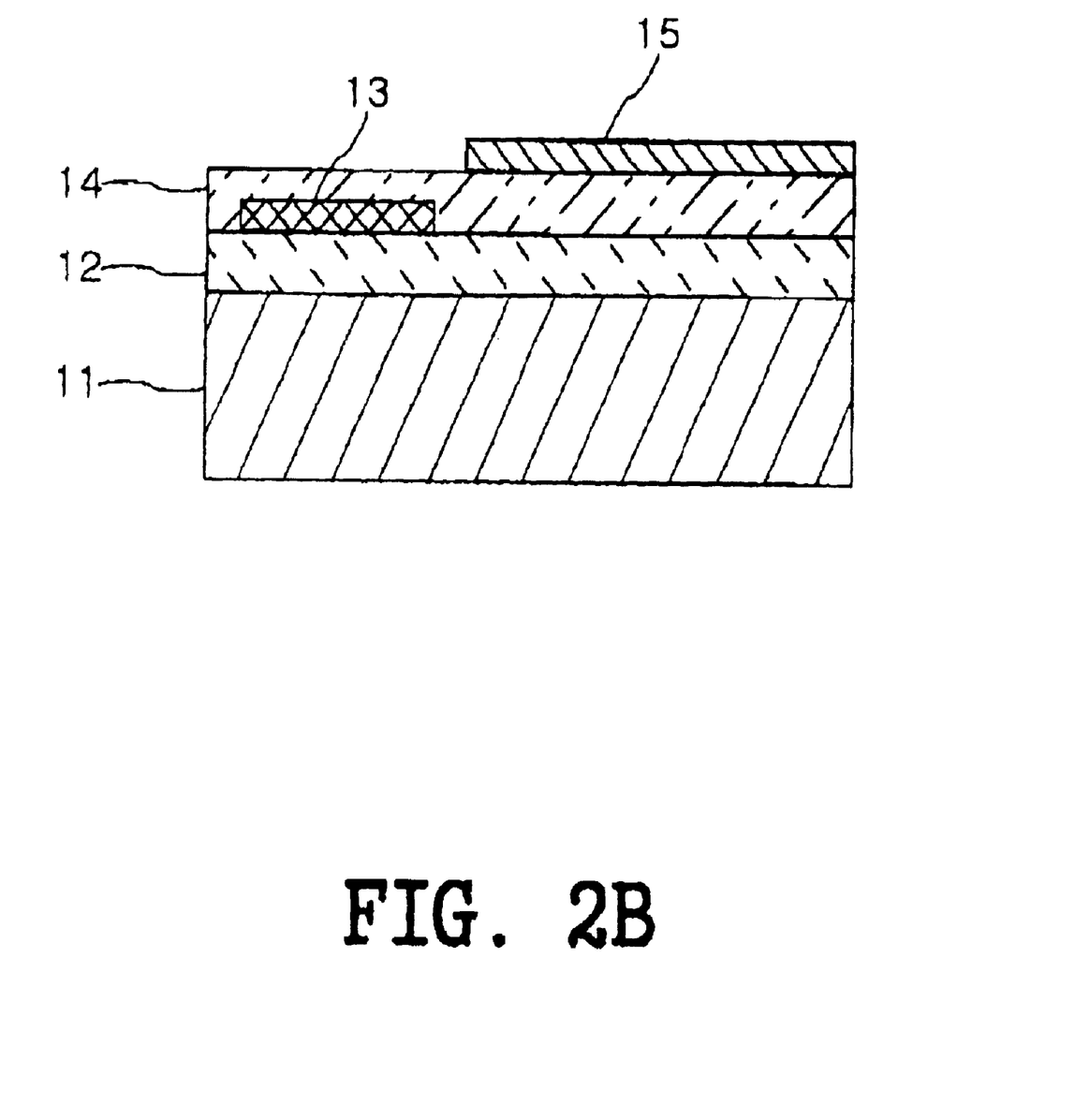
FIG. 2B illustrates a cross section of the layered structure from FIG. 2A having a mask for etching a layer on the second silica layer.

FIG. 2B illustrates the step of forming a mask 15 patterned according to the shape of the etching area on the second silica layer 14. The mask 15 is preferably formed of a metal. A metal mask is usually used to etch a layer too thick to be etched using a photoresist. A general metal mask formation method includes the steps of forming a metal layer, forming a photoresist layer on the metal layer, patterning the photoresist layer, and etching the metal layer using the photoresist pattern.

Figure 3A:
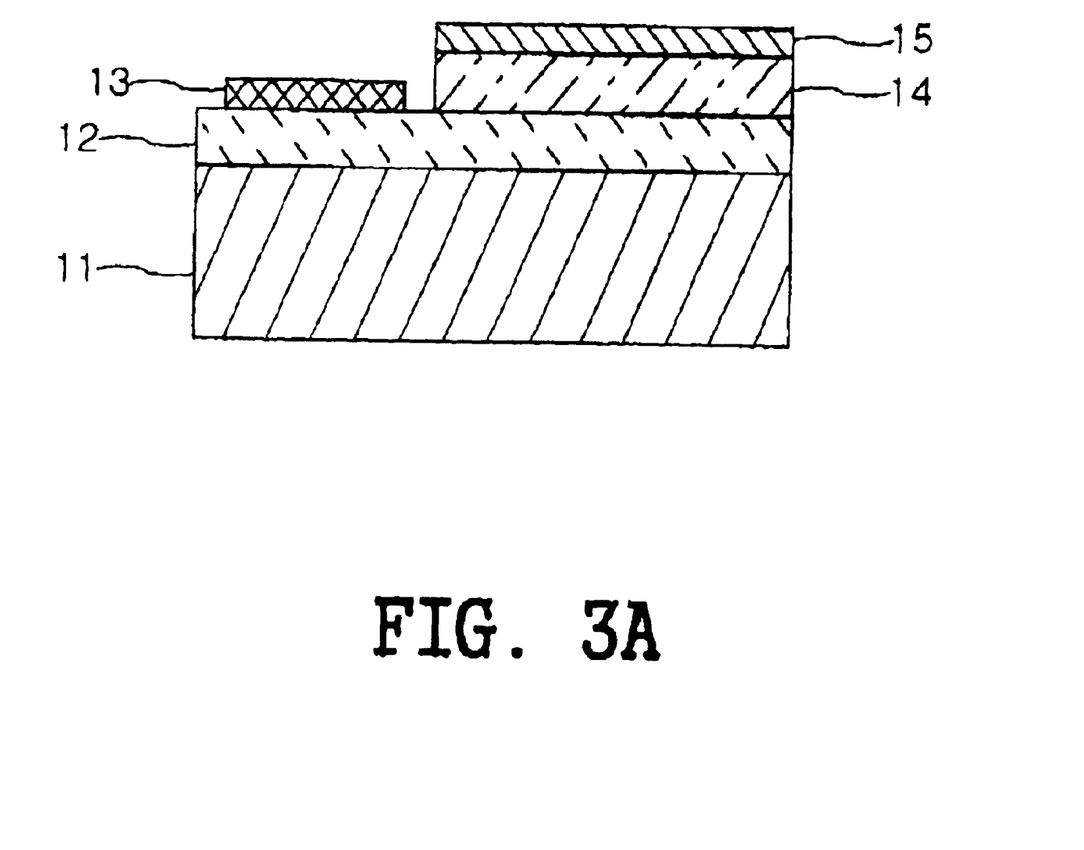
FIG. 3A illustrates a cross section of the layered structure shown in FIG. 2B having the second silica layer removed from the etching area.

FIG. 3A illustrates the step of removing the second silica layer 14 from the etching area using the mask 15 by dry etching. A silica layer is etched typically by dry etching or wet etching. Wet etching is so called because an object is etched in a liquid such as an acid, an alkali, or an organic solvent. Dry etching includes RIE and inductively coupled plasma etching using plasma etching equipment. Anisotropical etching is difficult and formation of a vertical side profile is impossible in wet etching, whereas an etch speed is easily controlled and a vertical side profile can be obtained in dry etching.

Figure 3B:
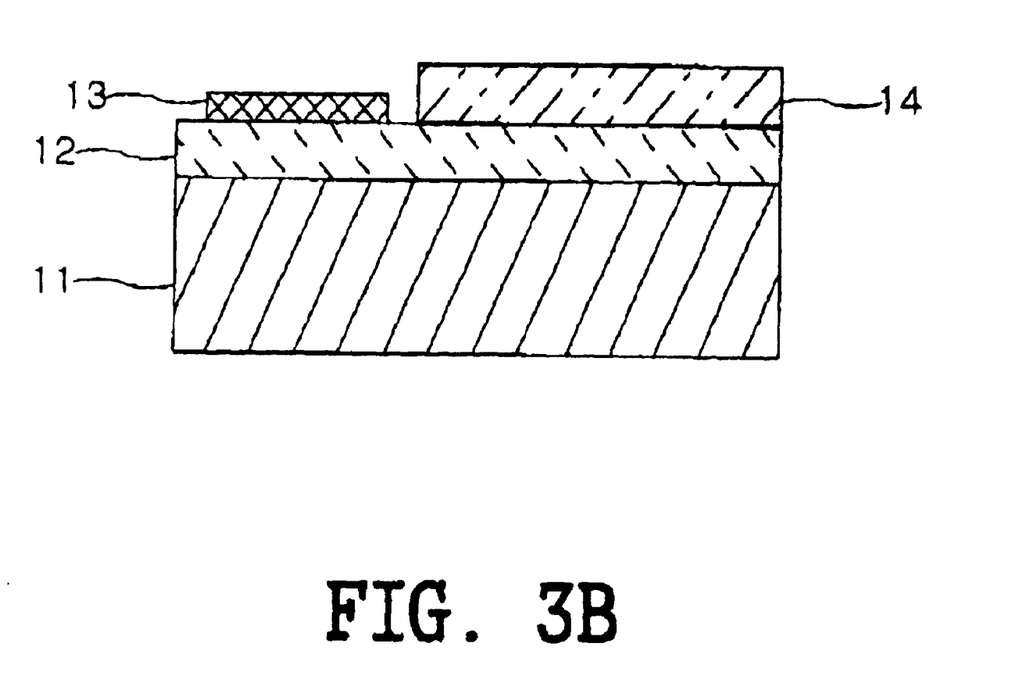
FIG. 3B illustrates a cross section of the layered structure shown in FIG. 3A after the mask has been removed from the remaining portion of the second silica layer.

FIG. 3B illustrates the step of removing the mask from the surface of the second silica layer 14. The mask 15 is removed using an appropriate etchant according to the material of the mask 15. For example, if the mask 15 is a photoresist, a photoresist remover is used. If the mask 15 is formed of chrome, a chrome remover is used.

Figure 4:
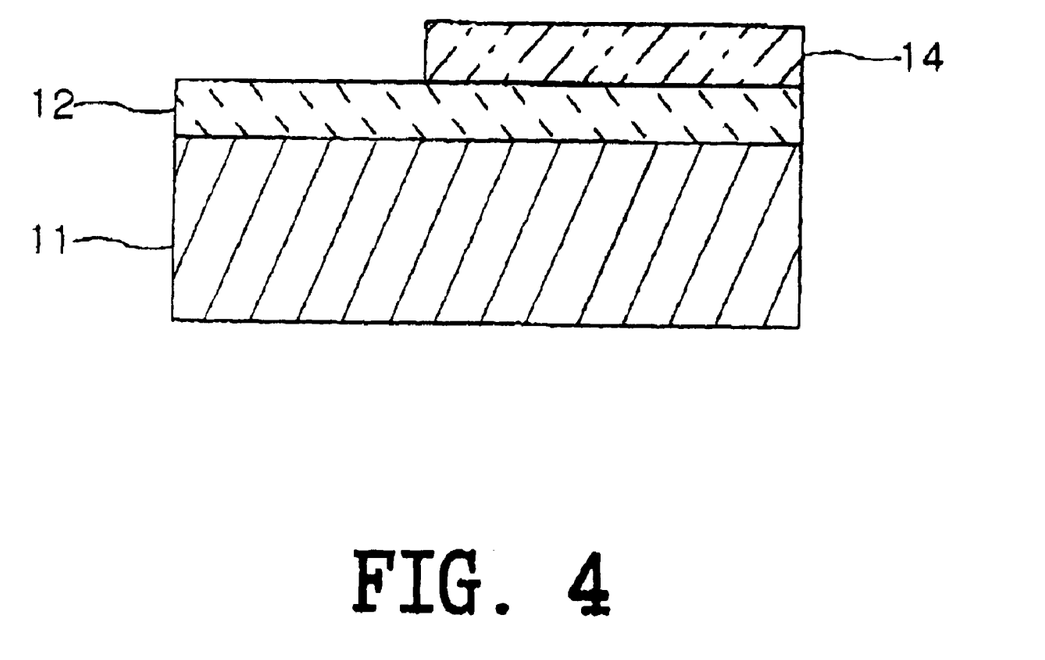
FIG. 4 illustrates the cross section of the layered structure shown in FIG. 3B after removal of the etch stop layer.

FIG. 4 illustrate the step of removing the etch stop layer 13. It is convenient in the processing aspect to remove the etch stop layer 13 by wet etching. Usual chemical solutions for wet etching are $H_2SO_4$, $H_3PO_4$, $H_2O_2$, HF, HCL, and $NH_4OH$.

As described above, the silica microstructure fabrication method according to the present invention permits that etching can be stopped at a desired position using an etch stop layer in dry-etching a silica layer. In particular, a desired vertical profile can be obtained.

A product by process of the present method results in a silica microstructure having layers with precisely dry-etched depths. This structure has precision heretofore unknown in the fabrication of silica microstructures having overcladding layers of indeterminant depth. The structure of a silica microstructure according to fabrication by the present method provides a distinguishable structure from silica microstructures of the prior art because the amount of etching does not vary from predetermined values. As prior art microstructures had unknown sized overcladding layers, the amount of etching could never provide the precise structure according to the present invention.

Figure 5A:
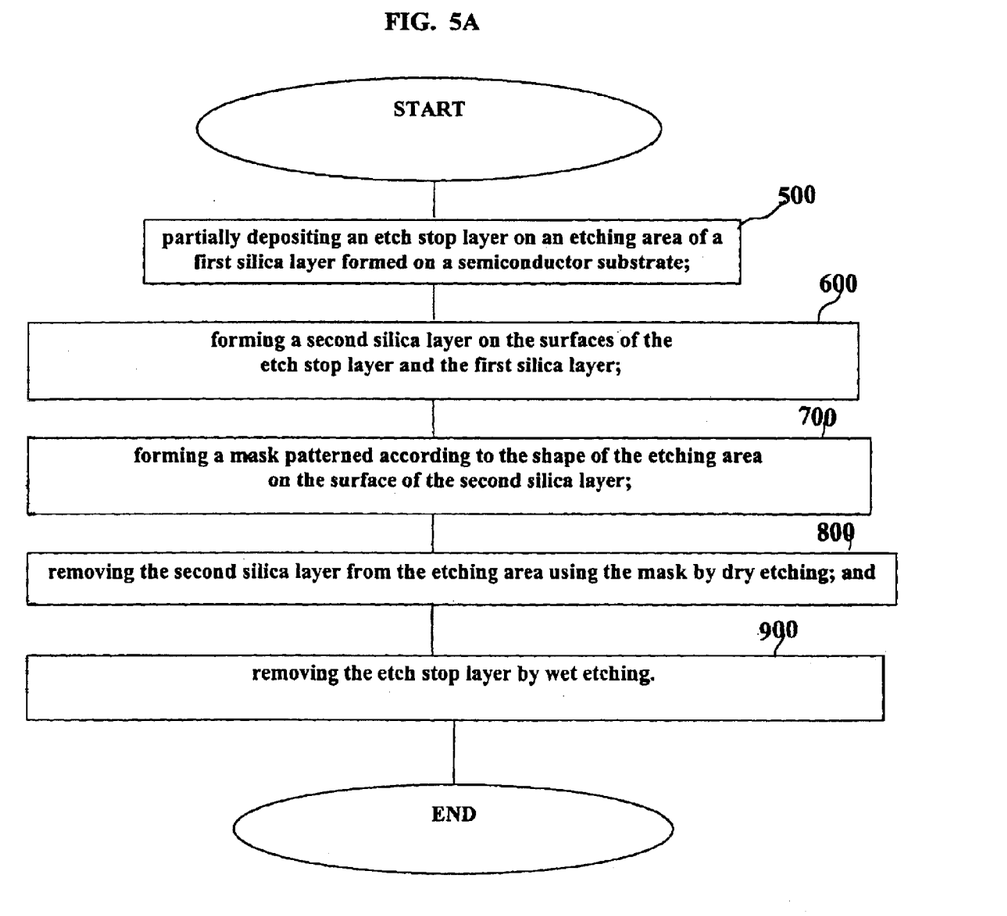
FIG. 5A is a flowchart providing an overview of the steps in a method of the present invention.

FIG. 5A presents an overview of a flowchart of steps of a method according to the present invention.

At step 500, an etch stop layer is partially deposited on an etching area of a first silica layer formed on a semiconductor substrate.

At step 600, a second silica layer is formed on the surfaces of the etch stop layer and first silica layer.

At step 700, a mask pattern is formed according to the shape of the etching area on the surface of the second silica layer.

At step 800, the second silica layer is removed from the etching area using the mask by dry etching.

Finally, at step 900, the etch stop layer is removed by wet etching.

Figure 5B:
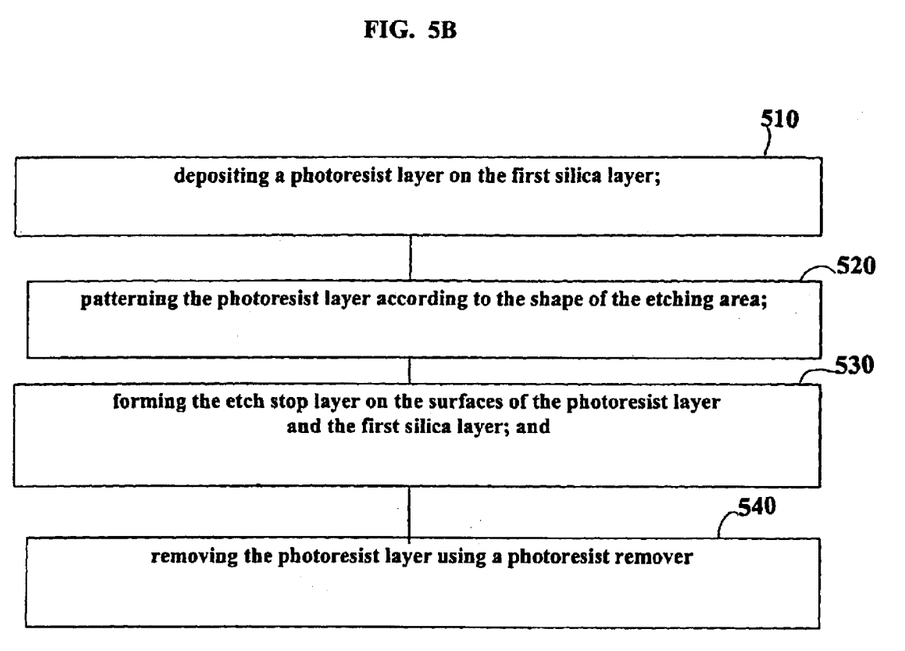
FIG. 5B provides detail with regard to an embodiment of the etch stop layer deposition according to the present invention.

FIG. 5B provides detail with regard to the depositing of the etch stop layer in step 500 of FIG. 5A.

At step 510, a photoresist layer is deposited on the first silica layer.

At step 520, the photoresist layer is patterned according to the shape of the etching area.

At step 530, the etch stop layer is formed on the surfaces of the photoresist layer and the first silica layer.

At step 540, the photoresist layer is removed using a photoresist remover.

Figure 6:
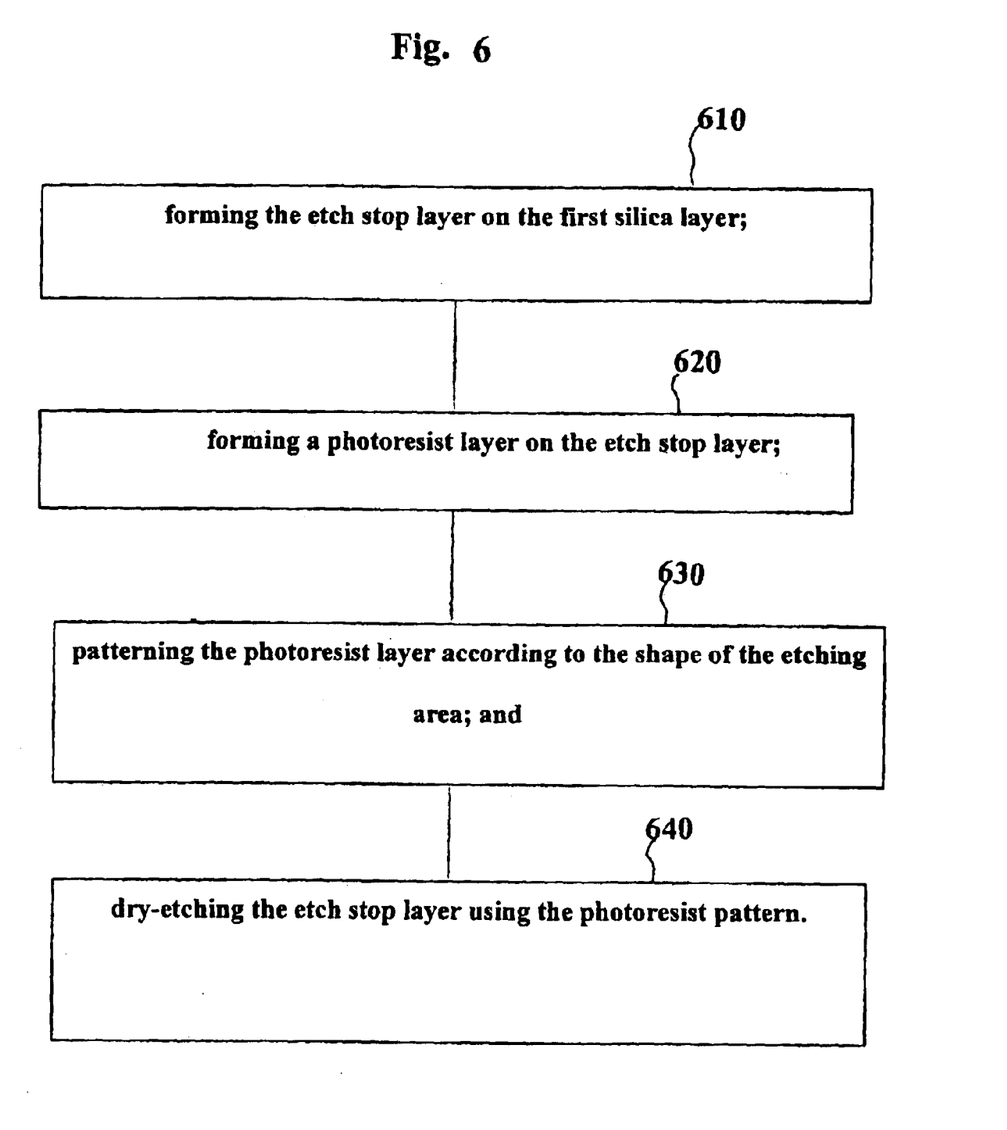
FIG. 6 provides detail with regard to another embodiment of the etch stop layer deposition according to the present invention.

FIG. 6 provides detail with regard to another way the etch stop layer may be deposited in step 500 of FIG. 5A.

At step 610, the etch stop layer is formed on the first silica layer.

At step 620, a photoresist layer is formed on the etch stop layer.

At step 630, the photoresist layer is patterned according to the shape of the etching area on.

At step 640, the etch stop layer is dry-etched using the photoresist pattern.

Figure 7:
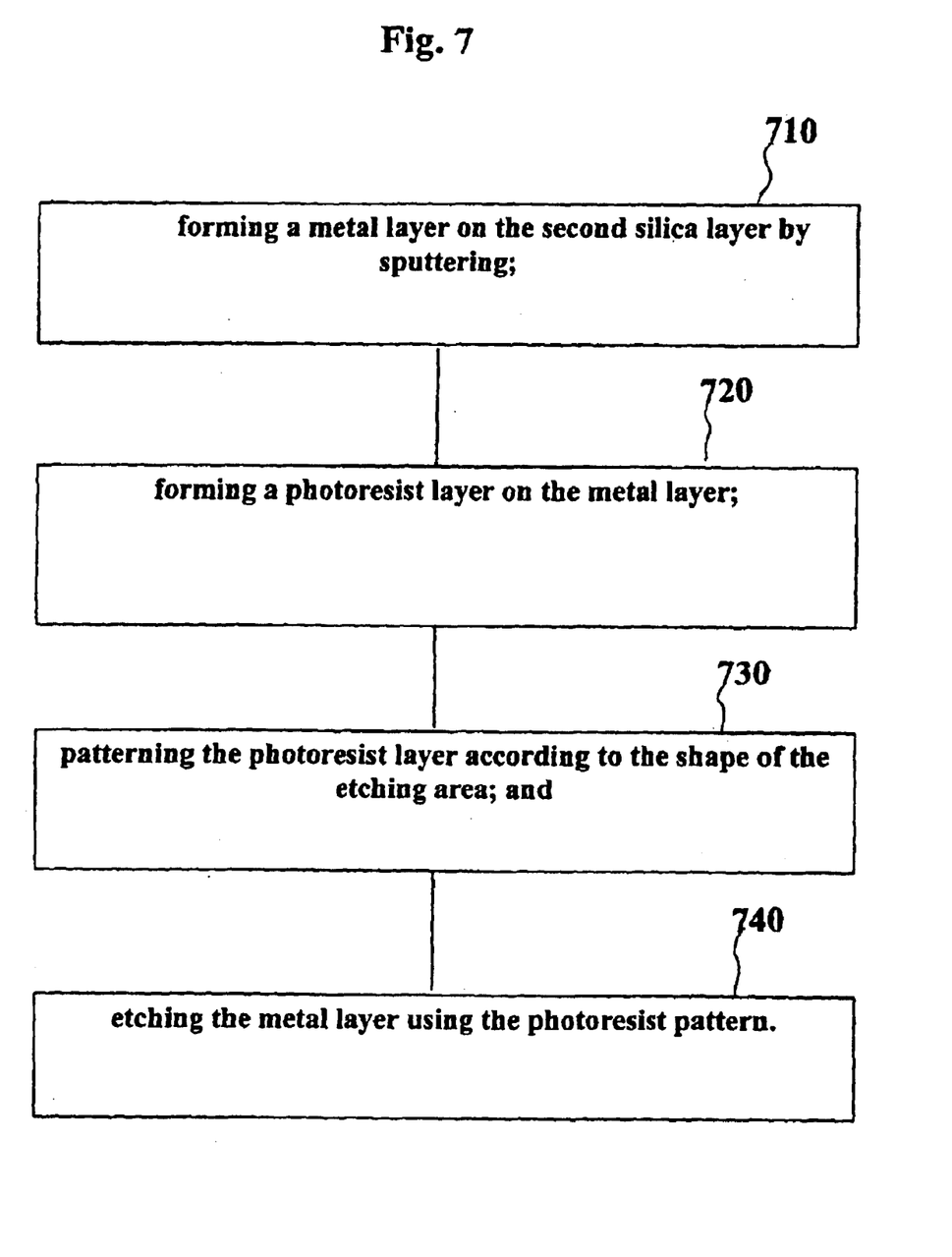
FIG. 7 provides detail with regard to the mask formation step.

FIG. 7 provides detail regarding one way that the mask formation step 700 shown in FIG. 5A can be embodied.

At step 710 a metal layer is formed on the second silica layer by sputtering.

At step 720, a photoresist layer is formed on the metal layer.

At step 730, the photoresist layer is patterned according to the shape of the etching area.

At step 740, the metal layer is etched using the photoresist pattern.

Accordingly, the present invention provides that the overcladding layer cay be removed according to a precise predetermined vertical profile.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for fabricating a silica microstructure method comprising the steps of:

depositing an etch stop layer formed of one of gold, platinum, and alumina on an etching area of a portion of a first silica layer formed on a semiconductor substrate;

forming a second silica layer on the surfaces of the etch stop layer and the first silica layer;

forming a mask patterned according to the shape of the etching area on the surface of the second silica layer;

removing the second silica layer from the etching area using the mask by Reactive Ion dry Etching(RIE) according to a predetermined vertical profile; and removing the etch stop layer by wet etching, wherein the silica micro structure comprising a planar light wave circuit (PLC).

2. The silica microstructure fabrication method of claim 1, wherein the etch stop layer deposition step comprises the steps of:

forming the etch stop layer on the first silica layer;

forming a photoresist layer on the etch stop layer;

patterning the photoresist layer according to the shape of the etching area; and dry-etching the etch stop layer using the photoresist pattern.

3. The silica microstructure fabrication method of claim 1, wherein the mask formation step comprises the steps of:

forming a metal layer on the second silica layer by sputtering;

forming a photoresist layer on the metal layer;

patterning the photoresist layer according to the shape of the etching area; and etching the metal layer timing the photoresist pattern.

4. The silica microstructure fabrication method of claim 1, wherein the first and second silica layers are formed by deposition.

5. A silica microstructure comprising a planar light wave circuit (PLC) havng first and second silica layers which is produced by the steps of:

depositing an etch stop layer formed of one of gold, platinum, and alumina on an etching area of a portion of a first silica layer formed on a semiconductor substrate;

forming a second silica layer on the surfaces of the etch stop layer and the first silica layer;

forming a mask patterned according to the shape of the etching area on the surface of the second silica layer;

removing the second silica layer from the etching area using the mask by a reactive ion dry etching (RIE) according to a predetermined vertical proifle; and removing the etch stop layer by wet etching.

wherein said mircrostructure comprises one of a planar lightwave circuit and a electro-mechanical (MEMS) device.

6. A silica microstructure according claim 5, wherein the etch stop layer deposition step comprises the steps of:

forming the etch stop layer on the first silica layer;

forming a photoresist layer on the etch stop layer;

patterning the photoresist layer according to the shape of the etching area; and dry-etching the etch stop layer using the photoresist pattern.

7. A silica microstructure according claim 5, wherein the mask formation step comprises the steps of:

forming a metal layer on the second silica layer by sputtering;

forming a photoresist layer on the metal layer;

patterning the photoresist layer according to the shape of the etching area; and etching the metal layer using the photoresist pattern.

8. A silica microstructure according to claim 5, wherein the first and second silica layers are formed by deposition.

9. A silica microstructure which is produced by the steps of:

depositing an etch stop layer formed of one of gold, platinum, and alumina on an etching area of a portion of a first silica layer formed on a semiconductor substrate;

forming a second silica layer on the surfaces of the etch stop layer and the first silica layer;

forming a mask patterned according to the shape of the etching area on the surface of the second silica layer;

removing the second silica layer from the etching area using the mask by dry etching according to a predetermined vertical profile; and removing the etch stop layer by wet etching, wherein said mircrostructure comprises one of a planar lightwave circuit and a electro-mechanical (MEMS) device.

10. A silica microstructure according claim 9, wherein the etch stop layer deposition step comprises the steps of:

forming the etch stop layer on the first silica layer;

forming a photoresist layer on the etch stop layer;

patterning the photoresist layer according to the shape of the etching area; and dry-etching the etch stop layer using the photoresist pattern.

11. A silica microstructure according claim 9, wherein the mask formation step comprises the steps of:

forming a metal layer on the second silica layer by sputtering;

forming a photoresist layer on the metal layer;

patterning the photoresist layer according to the shape of the etching area; and etching the metal layer using the photoresist pattern.

12. A silica microstructure according to claim 9, wherein the first and second silica layers are formed by deposition.

13. A silica microstructure according to claim 9, wherein the second silica layer is dry-etched by RIE (Reactive Ion Etching).

* * * * *